United States Patent Office 3,776,917
Patented Dec. 4, 1973

3,776,917
2-AMINO-6-PHENALKYL-AMINOPYRIDINES
AND DERIVATIVES THEREOF
Thomas A. Mann, New York, N.Y., and Frank J. Villani, West Caldwell, N.J., assignors to Schering Corporation, Bloomfield, N.J.
No Drawing. Continuation-in-part of abandoned application Ser. No. 49,577, June 24, 1970. This application June 5, 1972, Ser. No. 259,927
Int. Cl. C07d 31/42
U.S. Cl. 260—296 R           8 Claims

ABSTRACT OF THE DISCLOSURE

This invention relates to substituted phenylalkylaminopyridines and substituted phenacylaminopyridines, to their use as hypoglycemic agents and to the processes useful in the preparation thereof.

This application is a continuation-in-part of our co-pending application Ser. No. 49,577 filed June 24, 1970 now abandoned.

This invention relates to compositions of matter identified in the art of chemistry as substituted phenalkylaminopyridines and substituted phenacylaminopyridines, to the preparation thereof, and to their use as hypoglycemic agents.

More specifically, the invention sought to be patented in its composition of matter aspect is described as residing in the concept of having a substituted phenalkylaminopyridine or a substituted phenacylaminopyridine having the following structural formula:

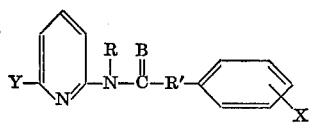

and the non-toxic pharmaceutically acceptable salts thereof, wherein Y is a member selected from the group consisting of nitro and amino; R is a member selected from the group consisting of hydrogen and lower alkyl; R' is lower alkylene; X is a member selected from the group consisting of hydrogen, halogen, lower alkyl, lower alkenyl, lower alkoxy, amino, nitro and trifluoromethyl, and B is a member selected from the group consisting of the group (H,H) and oxygen.

As used herein, the term "lower" of "lower alkyl," and "lower alkoxy" includes those radicals having up to six carbon atoms represented by such radicals as methyl, ethyl, isopropyl, cyclohexyl, methoxy, cyclopropenyl, cyclopentenyl, t-butyl, and such other straight, branched-chain and cyclized manifestations thereof.

The term lower alkylene as used herein includes those straight and branched-chain lower alkyl radicals having up to 6 carbon atoms from which one hydrogen atom has been removed. Exemplifying these radicals are 2-ethyl-propylene, 1-methyl-ethylene, ethylene, propylene, 2,2-dimethyl-butylene and the like.

The invention sought to be patented in its method-of-use aspect is described as residing in the concept of administering a therapeutically effective quantity of the tangible embodiment of a composition of matter herein-above described to a mammal suffering from a hyperglycemic condition thereby reducing the blood glucose levels.

In general, the preferred method for the preparation of the phenacylaminopyridines of this invention is effected by a condensation reaction wherein two moles of an appropriately Y-substituted 2-aminopyridine is reacted with one mole of an appropriately X-substituted acyl halide under standard condensation reaction conditions. Preferably, the condensation is effected by heating an admixture of equimolar quantities of the reactants in the presence of an anhydrous non-reactive solvent (e.g., dioxane, chloroform, benzene, toluene and the like) in the temperature range of about 80° C. to 120° C., although it is preferred to have the heating done at reflux temperatures. The foregoing condensation may be depicted as follows:

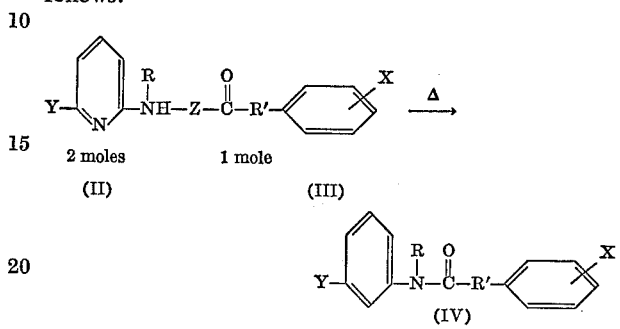

wherein X, Y, R and R' are as previously defined and Z is halogeno (preferably chloro or bromo) or a reactive equivalent thereof (e.g. hydroxy, cyanomethoxy and the like).

The phenalkylaminopyridines are prepared by chemically reducing the phenacylaminopyridines (IV) according to standard techniques. Preferably, the phenacylaminopyridines are chemically reduced with lithium aluminum hydride in the presence of a nonreactive solvent (e.g. tetrahydrofuran, dioxane and the like) at rezux temperatures.

Alternatively, the phenalkylaminopyridines may be prepared directly by the use of analogously known alkylation procedures such as by the condensation of an appropriately Y-substituted 2-aminopyridine with an appropriately X-substituted aralkyl halide; said condensation taking place in the presence of an alkali metal hydride and dioxane.

Still another alternate procedure for preparing the phenalkylaminopyridines is the condensation of the appropriately Y-substituted 2-aminopyridine with an appropriately X-substituted aldehyde according to standard procedures to produce an unsaturated intermediate which is chemically reduced by standard procedures such as catalytic hydrogenation. Alternatively, this same reaction can be effected in a one-step process by reacting the aldehyde and aminopyridine in the presence of sodium borohydride. Still another alternate procedure for the preparation of the phenalkylaminopyridines of this invention is the condensation of an appropriately Y-substituted 2-aminopyridine with an activated unsaturated aralkyl reactant using standard Michael Addition techniques.

The foregoing generally described methods for the preparation of the compounds of this invention will be particularly illustrated by the following specific examples.

EXAMPLE 1

6-amino-2-(phenylacetylamino)-pyridine

To a solution of 33 g. of 2,6-diaminopyridine in 150 ml. of dry dioxane maintained at a temperature of 25–30° C., add, in a dropwise manner, a solution of 23 g. of phenylacetyl chloride in 25 ml. of dry dioxane. Stir for 2–3 hours, maintaining the temperature, and filter. Concentrate to dryness in vacuo on a steam bath, leaving a thick brown oil which can be used directly in Example 2. For identification, recrystallize a small sample of the oil from a saturated solution of HCl (gas) in ethanol to give the hydrochloride salt of this example, M.P. 206–208° C.

EXAMPLE 2

6-amino-2-(β-phenethylamino)-pyridine

To a refluxing stirred suspension of 4.9 g. of lithium aluminum hydride in 300 ml. of dry tetrahydrofuran add, in a dropwise manner, a solution of 14.5 g. of 6-amino-2-(phenylacetylamino)-pyridine in 50 ml. of tetrahydrofuran and continue the refluxing and stirring for 6–8 hours. Cautiously, with outside cooling, decompose the mixture with water. Filter and concentrate the filtrate to an oil. Recrystallize the product from hexane to give the compound of this example, M.P. 76–77° C.

EXAMPLE 3

6-amino-2-(β-phenethylamino)-pyridine dimaleate

To a solution of 12.2 g. of 6-amino-2-(β-phenethylamino)-pyridine in 150 ml. of ethyl acetate, add a saturated solution of maleic acid in ethyl acetate until precipitation is complete. Heat the solution to reflux and allow to cool. Precipitate the dimaleate salt by cooling and recrystallize from an ethyl acetate-ethanol mixture, M.P. 125–126° C.

EXAMPLE 4

6-amino-2-(β-phenethylamino)-pyridine-3-amino-2-pyrazinoic acid salt

Dissolve 4 g. of 6-amino-2-(β-phenethylamino)-pyridine in 75 ml. of ether and add a solution of 2.8 g. of 3-aminopyrazine-2-carboxylic acid in 350 ml. of acetone. Filter and recrystallize from ethyl acetate to give the salt of this example, M.P. 164–165° C.

EXAMPLE 5

6-amino-2-(β-p-chlorophenethylamino)-pyridine maleate

Step 1. — 6 - amino-2-(β-p-chlorophenylacetylamino)-pyridine: By using the method of Example 1 prepare the compound of this step from 33 g. of 2,6-diaminopyridine and 28.4 g. of p-chlorophenyl acetyl chloride in 200 ml. total of dry dioxane.

Step 2. — 6-amino-2-(β-p-chlorophenethylamino)-pyridine: Reduce the 6-amino-2-(β-p-chlorophenylacetylamino)-pyridine of step 1 with lithium aluminum hydride using the method of Example 2.

Step 3. — 6-amino-2-(β-p-chlorophenethylamino)-pyridine dimaleate: Using the method of Example 3 and the 6-amino-2-(β-p-chlorophenethylamino)-pyridine of step 2 there is derived the compound of this example, M.P. 145–148° C.

EXAMPLE 6

6-amino-2-(β-m-chlorophenethylamino)-pyridine dimaleate

Step 1.—6-amino-2-(β-m-chlorophenacetylamino)-pyridine: By using the method of Example 1, prepare the compound of this step by reacting 33 g. of 2,6-diaminopyridine with 28.4 g. of m-chlorophenylacetylchloride in dry dioxane.

Step 2.—6-amino-2-(β-m-chlorophenethylamino)-pyridine: Reduce the 6-amino-2-(β-m-chlorophenacetylamino)-pyridine of step 1 by the method of Example 2 using lithium aluminum hydride in tetrahydrofuran.

Step 3.—6-amino-2-(β-m-chlorophenethylamino)-pyridine dimaleate: Convert the 6-amino-2-(β-m-chlorophenethylamino)-pyridine of step 2 to the dimaleate salt by the method of Example 3, giving the compound of this example, M.P. 136–137° C.

EXAMPLE 7

6-amino-2-(β-o-chlorophenethylamino)-pyridine

By using 2,6-diaminopyridine and o-chlorophenyl acetyl chloride and following the method of Example 5 there is produced the compound of this example.

EXAMPLE 8

6-amino-2-(β-p-methoxyphenethylamino)-pyridine

Step 1. — 6-amino-2-(β-p-methoxyphenylacetylamino)-pyridine: Condense 33 g. of 2,6-diaminopyridine with 27.6 g. of p-methoxyphenylacetyl chloride in dioxane by the method of Example 1.

Step 2. — 6-amino-2-(β-p-methoxyphenylethylamino)-pyridine: Reduce the 6-amino-2-(β-p-methoxyphenylacetylamino)-pyridine of step 1 with lithium aluminum hydride in tetrahydrofuran by the procedure of Example 2.

Similarly, by using the appropriately ortho or meta methoxy phenyl derivatives there is produced 6-amino-2-(β-o-methoxyphenethylamino)-pyridine and 6-amino-2-(β-p-methoxyphenethylamino)-pyridine respectively.

EXAMPLE 9

6-amino-2-(β-m-nitrophenethylamino)-pyridine

Step 1.—Cyanomethyl m-nitrophenylacetate: Dissolve 18.1 g. of m-nitrophenylacetic acid in a solution of 15 g. of triethylamine and 60 ml. of acetone. Add, in a dropwise manner, at room temperature, a solution of 12 g. of chloroacetonitrile in 50 ml. of acetone. Stir and reflux for 2 hours and pour into 1200 ml. of ice water and extract with ether. The product is distilled giving the compound of this step, B.P. 165–170° C./0.08 mm.

Step 2.—6-amino-2-(β-m-nitrophenylacetylamino)-pyridine: Add a solution of 14.1 g. of the cyanomethyl ester of step 1 in 50 ml. of benzene to a suspension of 7 g. of 2,6-diaminopyridine in 150 ml. of benzene and reflux for 24 hours. Decant the benzene solution and precipitate the hydrochloride salt of this aminopyridine by adding 10% HCl solution. Filter the precipitated solid and recrystallize from dilute ethanol, M.P. 234–235° C.

Step 3. — 6-amino-2-(β-m-nitrophenethylamino)-pyridine: Add at 0° C., a solution of 8.7 g. of aminopyridine from step 2 in 75 ml. of tetrahydrofuran to 40 ml. of diborane solution (containing 0.04 m.) and reflux gently for 1 hour. Allow the reaction mixture to stand overnight at room temperature. Decompose by adding ethanolic hydrogen chloride and remove the excess tetrahydrofuran solvent in a current of air. Dissolve the residue in water, basify with ammonium hydroxide and extract with chloroform. Remove the chloroform and triturate with isopropylether. Recrystallize from isopropylether giving the compound of this example, M.P. 93–94° C.

EXAMPLE 10

6-amino-2-(β-p-nitrophenethylamino)-pyridine

Using 36.2 g. of p-nitrophenylacetic acid as a starting material and following the same procedures of Example 9, there is produced the compound of this example.

EXAMPLE 11

6-amino-2-(β-p-aminophenethylamino)-pyridine

Dissolve 14.6 g. of 6-amino-2-(β-p-nitrophenethylamino)-pyridine in 200 ml. of ethanol. Add 1 teaspoonful of activated Raney Nickel catalyst and reduce in a Parr hydrogenator at room temperature and 60 p.s.i. hydrogen pressure. Filter off the catalyst and remove the ethanol in vacuo. Recrystallize from isopropyl acetate to give the product of this example.

EXAMPLE 12

6-amino-2-(β-m-trifluoromethylphenethylamino)-pyridine

Convert 22.3 g. of m-trifluoromethylphenylacetic acid to the cyanomethyl ester as in step 1 of Example 9. Condense this product with 2,6-diaminopyridine by the method of step 2 of Example 9 and reduce the resulting compound with diborane as in Example 9, step 3.

EXAMPLE 13

6-amino-2-(N-ethyl)-β-(p-chlorophenethylamino)-pyridine

To a solution of 27.4 g. of 2-N-ethyl-6-aminopyridine at 0–10° C. in 250 ml. of dioxane and 50 ml. of triethylamine add a solution of 43.8 g. of p-chlorophenethyl bromide. Reflux with stirring for 16 hours and filter. Concentrate to a residue and recrystallize from an ethyl acetate hexane mixture giving the compound of this example.

Similarly by substituting equivalent quantities of 2-N-(2-propyl)-6-aminopyridine; 2-N-methyl-6-aminopyridine; 2-N-cyclo-propyl-6-aminopyridine, for the 2-N-ethyl-6-aminopyridine reactant, and by following substantially the same procedure as set-forth in the foregoing example there is produced the corresponding N-alkylated derivative.

EXAMPLE 14

6-amino-2-(α-phenylpropylamino)-pyridine

Step 1.—6 - amino - 2-(α - phenylpropionylamino)-pyridine: Add a solution containing 50.4 g. of α-phenylpropionyl chloride to 72.2 g. of 2,6-diaminopyridine in 300 ml. of dioxane and proceed according to the method of Example 1.

Step. 2.—6-amino-2-(α-phenylpropylamino)-pyridine: Reduce the amide of step 1 by the procedure of Example 2 using 227 g. of lithium aluminum hydride in approximately 1 liter of dry tetrahydrofuran. Distill the resulting product giving the compound of this step, B.P. 190–197° C./0.2 mm.

EXAMPLE 15

6-amino-2-(β-ethyl-β-phenylethylamino)-pyridine maleate

Step 1.—6-amino-(2 - α - ethylphenylacetylamino)-pyridine: Following the method of Example 1 and using 60 gm. of the acid chloride and 72 g. of 2,6-diaminopyridine prepare the compound of this step.

Step 2.—6-amino-2-(β-ethyl-β-phenylethylamino)-pyridine: Reduce the 6-amino-(2-α-ethylphenylacetylamino)-pyridine of step 1 with lithium aluminum hydride in tetrahydrofuran by the method of Example 2.

Step 3.—6-amino-2-(β-ethyl-β-phenylethylamino)-pyridine: Convert the compound of step 3 to the maleate salt by the method of Example 3, M.P. 127–129° C.

EXAMPLE 16

6-amino-2-benzoylaminopyridine

Add a solution of 21.1 g. of benzoyl chloride in 25 ml. of dioxane to a solution of 36.4 g. of 2,6-diaminopyridine in 150 ml. of dioxane keeping the temperature at 25–30° C. Stir for 2–3 hours at room temperature and filter off the diaminopyridine hydrochloride. Concentrate the filtrate to dryness and triturate the residue with isopropyl ether. Recrystallize the product from ethylacetate, giving the compound of this example, M.P. 142–143° C.

Similarly, by using the appropriately substituted reactants and following the procedure of the preceding example, there is produced:

6-amino-2-(p-chlorobenzoylamino)-pyridine,
6-amino-2-(p-methoxybenzoylamino)-pyridine,
6-amino-2-(p-methylbenzoylamino)-pyridine,
6-amino-2-(o-chlorobenzoylamino)-pyridine,
6-amino-2-(p-trifluoromethylbenzoylamino)-pyridine,
6-amino-2-(m-nitrobenzoylamino)-pyridine,
6-amino-2-(p-aminobenzoylamino)-pyridine and
6-amino-2-(p-acetaminobenzoylamino)-pyridine.

EXAMPLE 17

6-amino-2-benzylaminopyridine

Reduce 6-amino-2-(benzoylamino)-pyridine with lithium aluminum hydride in tetrahydrofuran according to Example 2, giving the compound of this example, M.P. 75–78° C.

Similarly, the following compounds are prepared by substituting the appropriate starting materials and following the teaching of the above example:

6-amino-2-(p-chlorobenzylamino)-pyridine,
6-amino-2-(p-methoxybenzylamino)-pyridine,
6-amino-2-(p-methylbenzylamino)-pyridine,
6-amino-2-(o-chlorobenzylamino)-pyridine,
6-amino-2-(p-nitrobenzylamino)-pyridine,
6-amino-2-(p-trifluoromethylbenzylamino)-pyridine,
6-amino-2-(m-chloro-benzylamino)-pyridine,
6-amino-2-(m-methoxybenzylamoino)-pyridine,
6-amino-2-(p-ethenylbenzylamino)-pyridine, and
6-amino-2-(p-aminobenzylamino)-pyridine.

EXAMPLE 18

6-amino-2-(p-chlorobenzylamino)-pyridine

Mix 10.9 g. of 2,6-diaminopyridine with 14 g. of p-chlorobenzaldehyde in 150 ml. of formic acid and reflux for 4–6 hours with constant stirring. Remove the excess formic acid on a steam bath in vacuo and saponify the residue with 100 ml. of 10% HCl for 6 hours under reflux. Concentrate to dryness and dissolve the residue in water. Neutralize with sodium hydroxide. Extract with chloroform. Wash the chloroform extracts with water and distill off the chloroform. Recrystallize the residue from ethylacetate, giving the compound of this example.

The compounds of the invention sought to be patented exhibit the applied use characteristic of exerting a hypoglycemic effect when administered to a mammal suffering from a hyperglycemic condition. Although the compounds of this invention are effective as hypoglycemic agents in small dosages, the exact dosage strength required to produce the optimum therapeutic effect varies with the severity and stage of progression of the disease in the diabetic patient.

In general, the therapeutically effective quantity of compound required for the treatment of diabetes is determined by standard assays and well-known techniques. One suitable assay for the determination of the effective antidiabetic dose range is the Alanine Mouse Test wherein the test drug is administered to the test animal 15 minutes prior to the interperitoneal administration of alanine. Following administration of alanine the test animal (mouse) is bled every two hours and assayed for plasma glucose. According to the Alanine Mouse Test for compounds of this invention exert an anti-diabetic effect in mammals in the dosage range of about 100–400 mgm./kg. of body weight. In any given situation, however, the optimal therapeutic dosage for any given mammal suffering from diabetes may be established by the attending diagnostician by such supplementary standard laboratory test procedures as blood and urine analyses according to standard and well-known techniques.

In their functions as therapeutically useful compounds it is advantageous to administer the compounds to the host animal in admixture with an acceptable pharmaceutical carrier suitable for enteral or parenteral administration, said carrier constituting a major portion of the admixture. Such preparations may be in such forms as, for example, tablets, capsules and suppositories, or in liquid forms, as for example, elixirs, emulsions, sprays and injectables. In the formulations of pharmaceutical preparations there can be employed such substances which do not react with the active substance, as for example, water, gelatin, lactose, starches, magnesium stearate, talc, vegetable oils, benzyl alcohols, gums, polyalkylene glycols, petroleum jelly and the like. The active ingredient of such pharmaceutical preparations is preferably present in the preparations in such proportions by weight that the proportion by weight of the active ingredient to be administered lies between 0.1% and 50%.

TABLET FORMULATION

The following formulation provides for the manufacture of 1000 tablets:

| | Grams |
|---|---|
| (1) 6-amino-2-N-phenethylaminopyridine | 25.0 |
| (2) Lactose, U.S.P. | 181.0 |
| (3) Corn starch, U.S.P. | 92.5 |
| (4) Magnesium stearate | 1.5 |

Thoroughly granulate a mixture of 72.5 g. of corn starch and the lactose with a paste prepared by dissolving 20 g. of corn starch in 100 ml. of hot distilled water. Dry the resulting granulation, add a blended mixture of the active ingredient (1) and the magnesium stearate. Thoroughly blend and then press into tablets of 300 mg. each.

CAPSULE FORMULATION

The following formulation provides for the manufacture of 1000 capsules:

| | Grams |
|---|---|
| (1) 6-amino-2-N-phenethylaminopyridine | 25.0 |
| (2) Lactose | 273.5 |
| (3) Magnesium stearate | 1.5 |

Mix active ingredient (1) with the lactose and blend in the magnesium stearate. Fill hard gelatin capsules with 300 mg. of each of the blended mixture to produce capsules containing 25 mg. of 6-amino-2-N-phenethylaminopyridine.

PARENTERAL FORMULATION

The following formulation provides for the manufacture of 1000 vials each containing 10 mg. of active ingredient, as the hydrochloride salt.

| | Grams |
|---|---|
| (1) 6 - amino-2-N-phenethylaminopyridine(hydrochloride salt) | 10.00 |
| (2) Monobasic potassium phosphate | 6.00 |
| (3) Water for injection, U.S.P., q.s., ad. 1.00 l. | |

Dissolve ingredients (1), (2) and (3) in approximately 80% of the volume of water and filter the resulting solution. Add to the filtrate sufficient water to bring up to volume. Sterile-filter the solution and aseptically fill one milliliter portions of the solution into two milliliter vials, then lyophilize. After the lyophilized cake is dry, aseptically stopper the vials with rubber plugs and seal.

We claim:
1. A compound of the structural formula

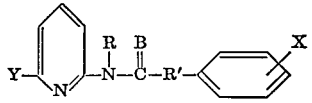

and the non-toxic pharmaceutically acceptable salts thereof, wherein Y is a member selected from the group consisting of nitro and amino; R is a member selected from the group consisting of hydrogen and lower alkyl; B is a member selected from the group consisting of (H,H) and oxygen; R' is lower alkylene and X is a member selected from the group consisting of halogen, lower alkyl, lower alkoxy, amino, nitro and trifluoromethyl.

2. A compound of claim 1 wherein Y is amino; R is lower alkyl; B is (H,H); and X is hydrogen.

3. A compound of claim 1 wherein Y is amino; R is hydrogen; B is (H,H); and X is hydrogen.

4. A compound of claim 3, said compound being 6-amino-N-phenethylaminopyridine.

5. A compound of claim 1 wherein Y is amino; R is hydrogen and X is lower alkoxy.

6. A compound of claim 5, said compound being 6-amino-2($\beta$-p-methoxyphenethylamino)-pyridine.

7. A compound of claim 1 wherein Y is amino; R is hydrogen; B is (H,H); and X is halogen.

8. A compound of claim 7, said compound being 6-amino-2($\beta$-p-chlorophenethylamino)-pyridine.

References Cited

Vohra et al., Chem. Abstracts, vol. 62, No. 13, 16, 231h, June 21, 1965.

ALAN L. ROTMAN, Primary Examiner

U.S. Cl. X.R.

260—295 AM, 295 S; 424—263, 266